Oct. 31, 1961 EITEL-FRITZ SPIEGEL 3,006,994
TELEVISION PICKUP CAMERA WITH SPIRAL SCANNING AND BEAM INTENSITY MODULATION PROPORTIONAL TO DEFLECTION VELOCITY
Filed Jan. 6, 1958
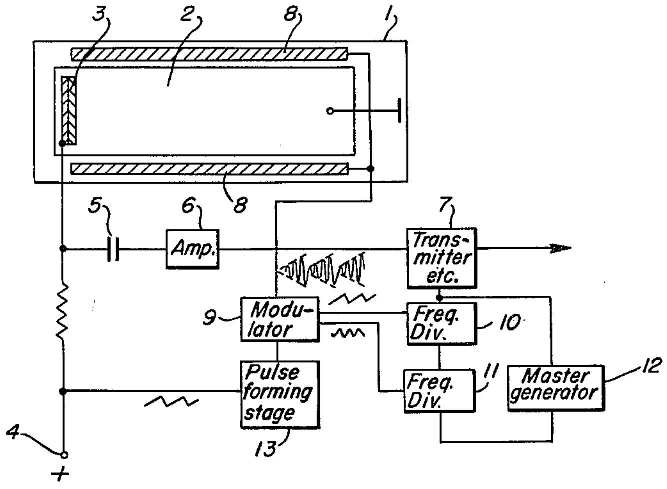
INVENTOR
EITEL-FRITZ SPIEGEL
BY Ralph B. Stewart
ATTORNEY 3,006,994
Patented Oct. 31, 1961

3,006,994

TELEVISION PICKUP CAMERA WITH SPIRAL SCANNING AND BEAM INTENSITY MODULATION PROPORTIONAL TO DEFLECTION VELOCITY

Eitel-Fritz Spiegel, Furth, Bavaria, Germany, assignor to Max Grundig, Furth, Germany Filed Jan. 6, 1958, Ser. No. 707,181
Claims priority, application Germany Jan. 26, 1957
3 Claims. (Cl. 178—7.2)

For certain purposes, in televising scenes, especially in so-called industrial television installations, use is made of spiral scanning instead of the usual line-by-line scanning. This spiral type of scanning can be obtained in a simple manner by supplying to the deflection system two sinusoidal oscillations having the same frequency and shifted in phase with respect to each other by 90°, the amplitudes of the oscillations varying in a manner to produce a saw-tooth envelope. It has been shown that when using spiral scanning, the contrast over the picture surface becomes non-uniform due to the change in speed of the scanning beam which has a greater peripheral speed over the surface of the signal plate as it approaches the outside edge of the plate. Furthermore, it is known that the sensitivity of the signal plate of a picture pickup tube, in which the photo-effect principle is used, is a function of the speed of the electron beam over the surface of the plate.

To eliminate this difficulty, it is old to provide speed control means for the scanning ray. Such a speed control means, however, requires a relatively high expenditure for switch means, tubes, and the like. These disadvantages have heretofore greatly restricted the use of spiral scanning.

The invention is concerned with the avoidance, by reliance on the characteristics of a light-sensitive layer, of the disadvantages that arise when spiral scanning is used. Experience teaches that the sensitivity of a storage-picture-pickup tube increases in value for slow scanning and decreases for fast scanning. This is also true of pickup tubes wherein the sensitivity has a definite rise or delay time with relation to the impingement of the electron beam onto the photo-sensitive surface. Since the signal output from the plate is proportional to its sensitivity, provision must be made to hold the sensitivity, and therewith the contrast, constant over the whole picture surface. There are two further possibilities besides the above-mentioned speed control. Either the light intensity is reduced by suitable means in dependence on the scanning-ray speed or the signal plate voltage is correspondingly controlled. It is known that by changing the positive signal-plate-voltage a change in sensitivity of the picture pickup tube is possible.

According to the present invention, a television pickup camera having a storage picture tube based on the photo-effect is provided with means for spiral-type scanning principle, and the signal plate voltage has superimposed periodically upon it, a relatively slowly increasing and quickly decreasing control voltage in such a way that the resultant signal plate voltage changes periodically proportionately to the peripheral speed of the scanning ray in such a direction that the sensitivity remains entirely or substantially constant. The form of the control voltage may, for example, have a sawtooth form or a parabolic form or may change in some other similar way so as to produce the desired effect.

It is especially advantageous to take off the above-mentioned control voltage from the deflection system that is present in the television pickup camera. According to the invention, one can avoid in the simplest way and by the simplest means one of the most serious short-comings of spiral scanning.

It is therefore an object of my invention to compensate for the variation of sensitivity of the plate of a television picture pickup tube wherein a spiral scan is utilized.

Another object is to control the level of the output signal of a television picture pickup tube in which a spiral scan is used.

Other objects will become apparent as the description of the operation of the device in accordance with the figure of the drawing proceeds.

In the drawing, there is shown schematically one embodiment of the invention. The television pickup camera 1 contains the picture tube 2, to the signal plate 3 of which the signal plate voltage is applied by way of the connection from supply terminal 4. Tube 2 also includes the usual arrangement for focusing an electron beam on the plate 3 from a cathode located in the opposite end of the tube. The picture signal from plate 3 is carried by way of capacity 5 to the picture amplifier 6 and from there it is supplied to the transmitter stage 7 or the like in amplified form. The control of the scanning beam is effected in known manner with the help of the deflection system comprising coils 8, for which the deflection voltages or currents are derived from the modulator 9. This modulator 9 receives on the one hand a sawtooth voltage produced from the frequency divider 10 and also a sinusoidal voltage of higher frequency from the frequency divider 11. Both frequency dividers divide the frequency of a master generator 12 in any suitable ratio. For example, the frequency of the master generator can be 105 kilocycles per second. The frequency divider 11 then delivers a sinusoidal voltage with a frequency of 15 kilocycles per second while the frequency divider 10 yields a sawtooth voltage with a frequency of 50 cycles per second. Both of these voltages are supplied to the modulator stage 9 where the sinusoidal voltage is modulated by the saw-tooth voltage to provide a wave form having the saw-tooth envelope shown in the drawings and which is applied to one set of deflection coils 8. Another set of coils, not shown, but arranged at right angles to the first set, is supplied with the same form of deflection current except that its sinusoidal wave is displaced in place by 90° with respect to the first deflection current, thus causing the beam to trace a spiral path over plate 3 in known manner.

From the modulator stage 9 a corresponding impulse is supplied to the impulse forming stage 13. This impulse forming stage 13 shapes the impulse into, for example, a sawtooth control voltage. This sawtooth control voltage is superposed on the positive signal plate voltage derived from supply terminal 4. By this means, the result is obtained that the sensitivity of the signal plate which is a function of both the signal plate voltage and also of the scanning speed, remains constant. By this means, furthermore, the contrast on the whole light sensitive layer is kept uniform and constant independently of the speed of the scanning ray. The frequency of the control voltage corresponds to the scanning frequency of the scanning beam, that is, it is related to the time necessary for the beam to trace a spiral from the center to the outer edge of the picture tube or vice versa.

The inventive thought is not limited to the embodiment shown and described but can be carried out in other ways in other modifications apparent to a worker skilled in the art. It is, for example, possible to derive a suitable control voltage directly from the primary generator.

I claim:

1. A television transmission system comprising a picture pickup tube having a photosensitive target electrode to which the image to be scanned is applied, said target electrode being of the type which changes in sensitivity with changes in bias voltage applied thereto, means for applying a bias voltage to said target electrode through an impedance, means for producing a beam of electrons for scanning the target electrode to provide an output voltage across the impedance, the value of said output voltage for a predetermined brightness of a scanned elemental area being a function of the bias voltage on the target electrode and the scanning speed of the beam, control means for moving said beam to scan the target electrode at varying rates of speed, and means acting in timed relation with the scanning of said beam to vary the bias voltage on the target electrode in accordance with variations in the scanning speed of the beam to maintain the output voltage, due to a predetermined brightness of a scanned elemental area, at a constant value.

2. A television transmission system in accordance with claim 1, in which the means for modifying the value of the output voltage is responsive to the operation of the control means for moving the beam.

3. A television transmission system comprising a picture pickup tube having a photosensitive target electrode to which the image to be scanned is applied, said target electrode being of the type which changes in sensitivity with changes in bias voltage applied thereto, means for applying a bias voltage to said target electrode through an impedance, means for producing a beam of electrons for scanning the target electrode to provide an output voltage across the impedance, the value of said output voltage for a predetermined brightness of a scanned elemental area being a function of the bias voltage on the target electrode and the scanning speed of the beam, deflecting means for moving said beam to trace a spiral path over the target electrode at a substantially constant angular velocity and means acting in timed relation with the scanning of the beam to vary the bias voltage on the target electrode in accordance with the distance of the beam from the center of the spiral.

References Cited in the file of this patent

UNITED STATES PATENTS

| | | |
|---|---|---|
| 2,237,655 | Compton | Apr. 8, 1941 |
| 2,703,150 | Rieber | Mar. 1, 1955 |